US006990186B2

(12) United States Patent
Thacker

(10) Patent No.: US 6,990,186 B2
(45) Date of Patent: Jan. 24, 2006

(54) SYSTEMS AND METHODS FOR FACILITATING PROVISIONING OF CIRCUITS AND WORK CONTROL IN A TELECOMMUNICATIONS ENVIRONMENT

(75) Inventor: Terry D. Thacker, Lawrenceburg, KY (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 465 days.

(21) Appl. No.: 10/314,769

(22) Filed: Dec. 9, 2002

(65) Prior Publication Data

US 2004/0203953 A1 Oct. 14, 2004

(51) Int. Cl.
*H04M 3/42* (2006.01)
(52) U.S. Cl. ................................. 379/201.12
(58) Field of Classification Search ........... 379/201.01, 379/201.02, 201.12, 9.01–9.04, 15.03
See application file for complete search history.

(56) References Cited

U.S. PATENT DOCUMENTS

| 5,790,634 A | * | 8/1998 | Kinser, Jr. et al. ....... 379/29.01 |
| 6,018,567 A | * | 1/2000 | Dulman .................... 379/32.03 |
| 6,330,586 B1 | * | 12/2001 | Yates et al. ................... 709/201 |
| 6,870,900 B1 | * | 3/2005 | Beamon .................... 379/9.03 |
| 2003/0086551 A1 | * | 5/2003 | Burr et al. ............. 379/221.08 |
| 2003/0177475 A1 | * | 9/2003 | de Jong ...................... 717/120 |

* cited by examiner

*Primary Examiner*—Benny Q. Tieu
(74) *Attorney, Agent, or Firm*—Lee & Hayes, PLLC

(57) ABSTRACT

A method of adding a notation to a plurality of modules in a telecommunications provisioning system. The method includes accepting input of the notation and automatically invoking a first module. The method also includes inputting the notation to the first module, automatically invoking a second module, and inputting the notation to the second module.

20 Claims, 3 Drawing Sheets

SYSTEMS AND METHODS FOR FACILITATING PROVISIONING OF CIRCUITS AND WORK CONTROL IN A TELECOMMUNICATIONS ENVIRONMENT

BACKGROUND

The present invention is directed generally and in various embodiments to systems and methods for facilitating provisioning of circuits and work control in a telecommunications environment.

Telecommunications service providers often employ various software systems that allow for provisioning of various types of services. For example, a system is employed by many telecommunications service providers that assists in provisioning new circuits between telephone central offices (COs) or between telephone COs and customer provided equipment (CPE). Also, many telecommunications service providers employ a work control system that is used to automate many work assignments that are required to install and repair client facilities, trunks, special service circuits, and business and residential lines. A service (or work) order that requests the provisioning (e.g. installation, change, or disconnection) of a service is usually input into the systems to identify the service that needs provisioned, when it needs provisioned, and what action or actions must be taken to provision the service.

Oftentimes, a user of the above-described systems must enter information into one of the systems and subsequently enter the identical information into the other system. For example, a user of the systems may want to place a comment, or a note, relating to a work order in the provisioning system. The user may then be required to enter the identical comment into the work control system. However, the systems require that the comment be entered separately into each system. Such redundant entry may not be efficient in terms of time spent entering the data and in terms of accuracy.

SUMMARY

In one embodiment, the present invention is directed to a method of adding a notation to a plurality of modules in a telecommunications provisioning system. The method includes accepting input of the notation and automatically invoking a first module. The method also includes inputting the notation to the first module, automatically invoking a second module, and inputting the notation to the second module.

In one embodiment, the present invention is directed to a system. The system includes a provision management module and a work control module in communication with the provision management module. The system also includes a user terminal in communication with the provision management module and the work control module, and a note input module in communication with the user terminal, wherein the note input module enables a user of the user terminal to simultaneously input a notation into the provision management module and the work control module.

In one embodiment, the present invention is directed to a telecommunications apparatus. The apparatus includes means for accepting input of a notation, means for automatically invoking a first module, and means for inputting the notation to the first module. The apparatus also includes means for automatically invoking a second module and means for inputting the notation to the second module.

In one embodiment, the present invention is directed to a computer readable medium having stored thereon instructions which, when executed by a processor, cause the processor to accept input of a notation, automatically invoke a first telecommunications module, input the notation to the first telecommunications module, automatically invoke a second telecommunications module, and input the notation to the second telecommunications module.

BRIEF DESCRIPTION OF THE DRAWINGS

Further advantages of the present invention may be better understood by referring to the following description taken in conjunction with the accompanying drawings, in which.

DESCRIPTION

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein.

Figure 1:
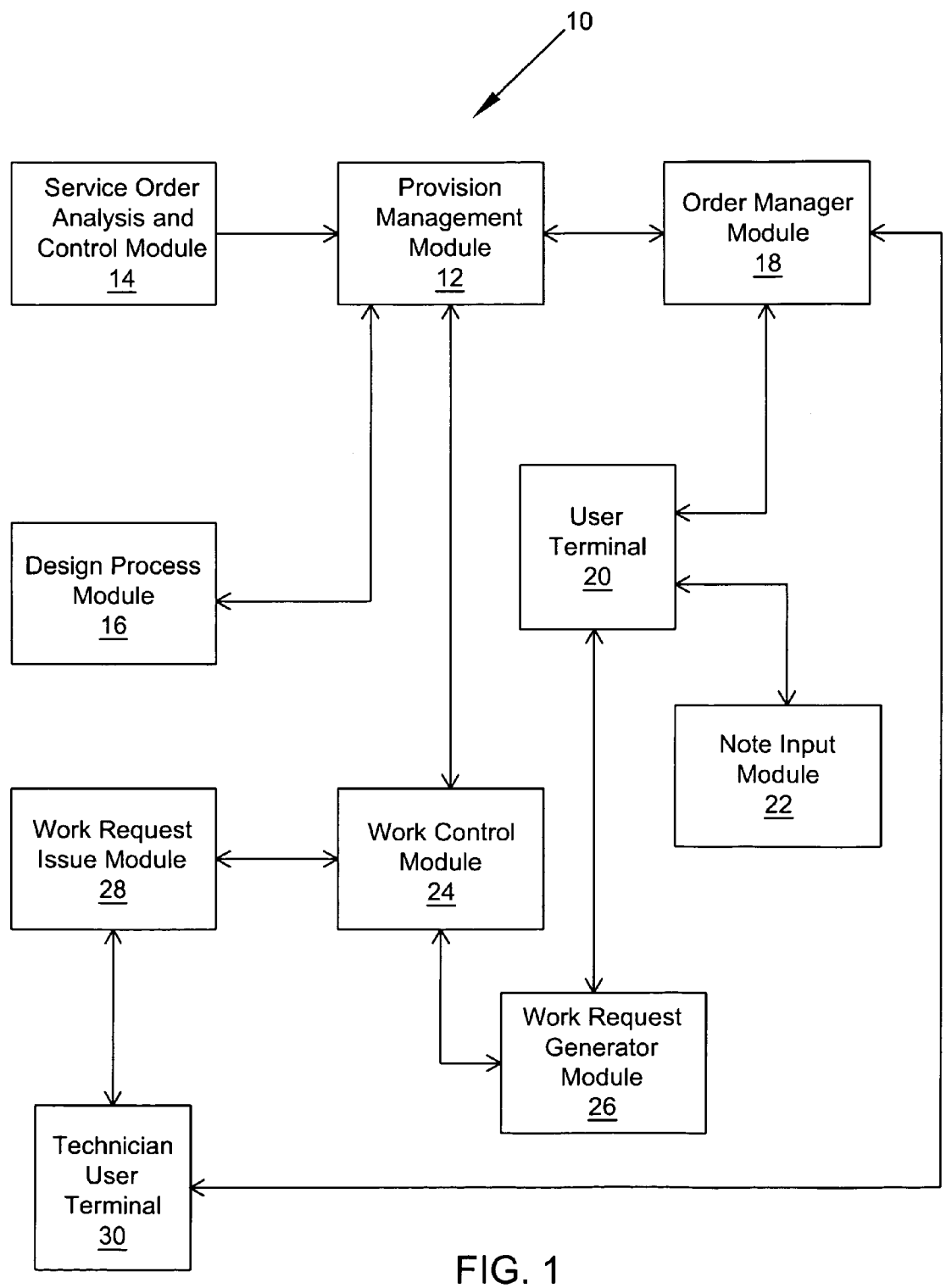
FIG. 1 is a diagram illustrating a provisioning and work control system according to one embodiment of the present invention.

FIG. 1 is a diagram illustrating a provisioning and work control system 10 according to one embodiment of the present invention. The system 10 may be used by a telecommunications service provider to assist in provisioning telecommunications services. For example, a circuit provisioning group of a telecommunications service provider could employ the system 10 to perform, among other tasks, circuit provisioning functions.

The system 10 includes a provision management module 12. The provision management module 12 may be, for example, the Trunk Integrated Record Keeping System (TIRKS®) system that is offered by Telcordia Technologies, Inc. The TIRKS® system is an integrated system that supports the total network provisioning process for special service circuits, message trunks, and carrier circuits and also provides inventory management of facilities and equipment. The provision management module 12 may create an order design based on input service orders.

The system 10 also includes a service order analysis and control module 14. The service order analysis and control module 14 may be in communication with the provision management module 12 to input service orders into the module 12. The service order analysis and control module 14 may be, for example, the SOAC system that is offered by Telcordia Technologies. The service order and analysis control module 14 may manage order activity to determine which operations are involved in provisioning a service. The module 14 may also identify service order problems and forward them to the appropriate locations for resolution. Also, the module 14 may allow for provisioning, revising, canceling, and completing orders for both complex and simple services.

The system 10 includes a design process module 16. The design process module 16 may be, for example, the TIRKS®-C1 system offered by Telcordia Technologies. The design process module 16 may process the order design created by the provision management module 12 for subsequent delivery to a work request generator module 26. The system 10 also includes an order manager module 18. The module 18 may be, for example, the TIRKS®-GOC generic order control system offered by Telcordia Technologies. The order manager module 18 may control, for example, message trunk, span, special service, and carrier system orders by tracking critical dates along the life cycle of an order as it flows from marketing or engineering to a provision group and then to a network operations organization in a telecommunications company. The order manager module 18 may allow for data input to the provision management module 12 via a user terminal 20. Such data input may be, for example, notes that detail the status of an order as milestones are reached or problems are encountered (e.g. notes indicating that required equipment is not available, a customer location is not ready, an order is incorrect, or that the engineering work on an order is incorrect). The user terminal 20 may be, for example, a computer such as, for example, a personal computer (PC) or any other suitable device.

The user terminal 20 is in communication with a note input module 22. The note input module 22 allows for the entry of text notations into various components of the system 10 as described hereinbelow in conjunction with FIGS. 2A and 2B. It can be understood that the module 22 may be, for example, embodied as a computer program and stored on the user terminal 20 or may be, for example, embodied as a computer program and stored on a remote computer such as, for example, a server that is in communication with the user terminal 20 via a computer network such as, for example, a local area network (LAN) or the Internet. A user of the user terminal 20 could be, for example, a person that works in a circuit provisioning group of a telecommunications service provider.

The system 10 includes a work control module 24. The module 24 may be, for example, the Work and Force Administration System (WFA) that is offered by Telcordia Technologies. The work control module 24 automates various work assignments that are required to install and repair telecommunications customer facilities, trunks, special service circuits, and business and residential lines.

The work request generation module 26 is in communication with the user terminal 20 and the work control module 24. The work request generation module 26 may be, for example, WFA-C system that is offered by Telcordia Technologies. The work request generation module 26 may generate work requests for use by, for example, technicians that work for a telecommunications service company. The work request generation module 26 may receive service orders from the provision management module 12 and may then build records and work requests as required and may maintain a record of the work accomplished until completion, at which time the work request generation module 26 may interface with the provision management module 12 to provide an order completion notification.

A work request issue module 28 is in communication with the work control module 24. The work request issue module 28 may be, for example, the WFA-DI system that is offerred by Telcordia Telecommunications. The work request issue module 28 issues work requests to a technician user terminal 30 that is in communication with the module 28 and the order manager module 18. The work requests may be issued, for example, by the module 28 storing the work requests and allowing a user of the terminal 30 to view the work requests.

The technician user terminal 30 may be, for example, a computer such as, for example, a personal computer (PC) or any other suitable device.

Figure 2A:
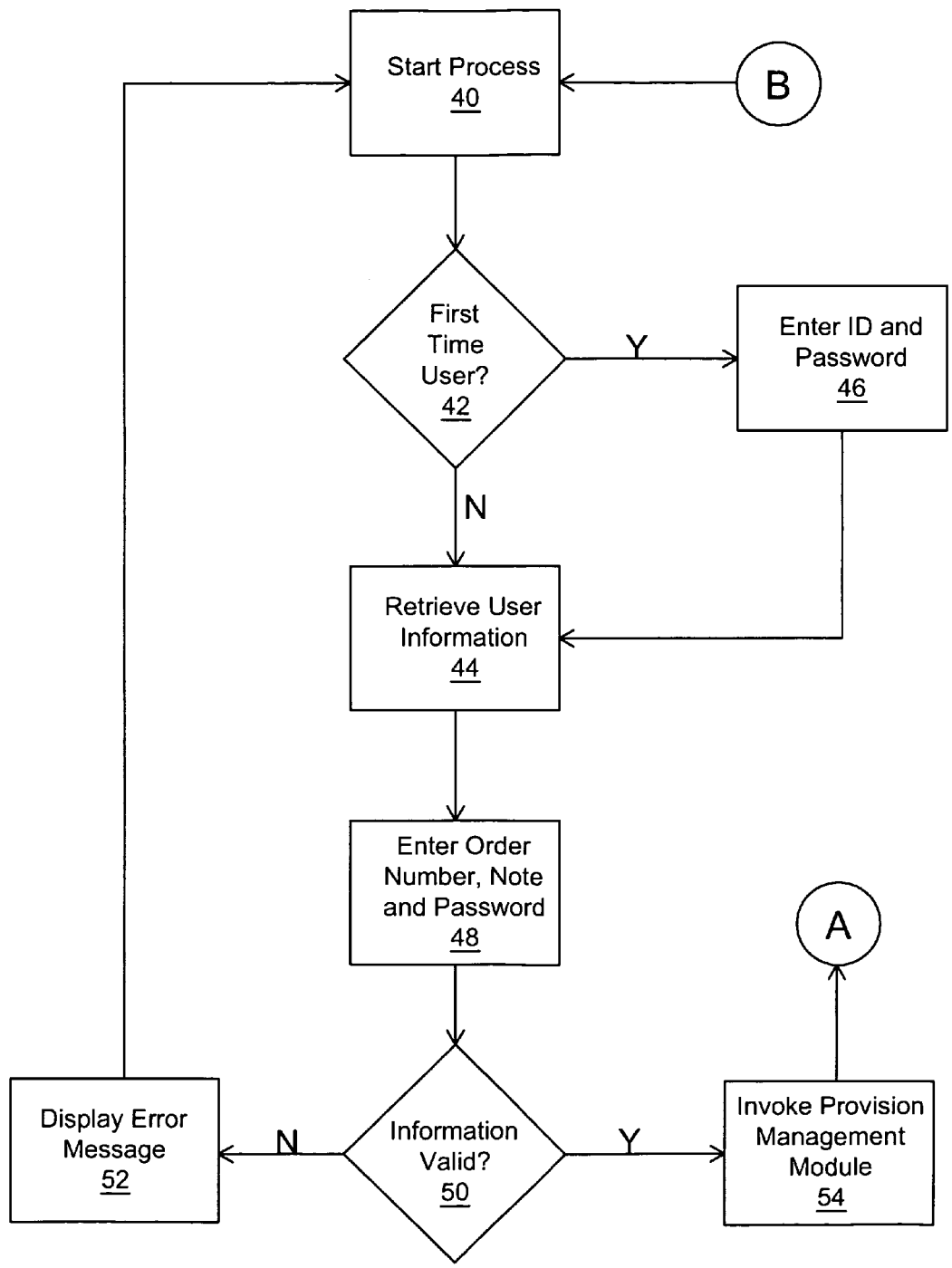
FIGS. 2A and 2B are diagrams illustrating a process flow through the note input module of the system of FIG. 1 according to one embodiment of the present invention.
Figure 2B:
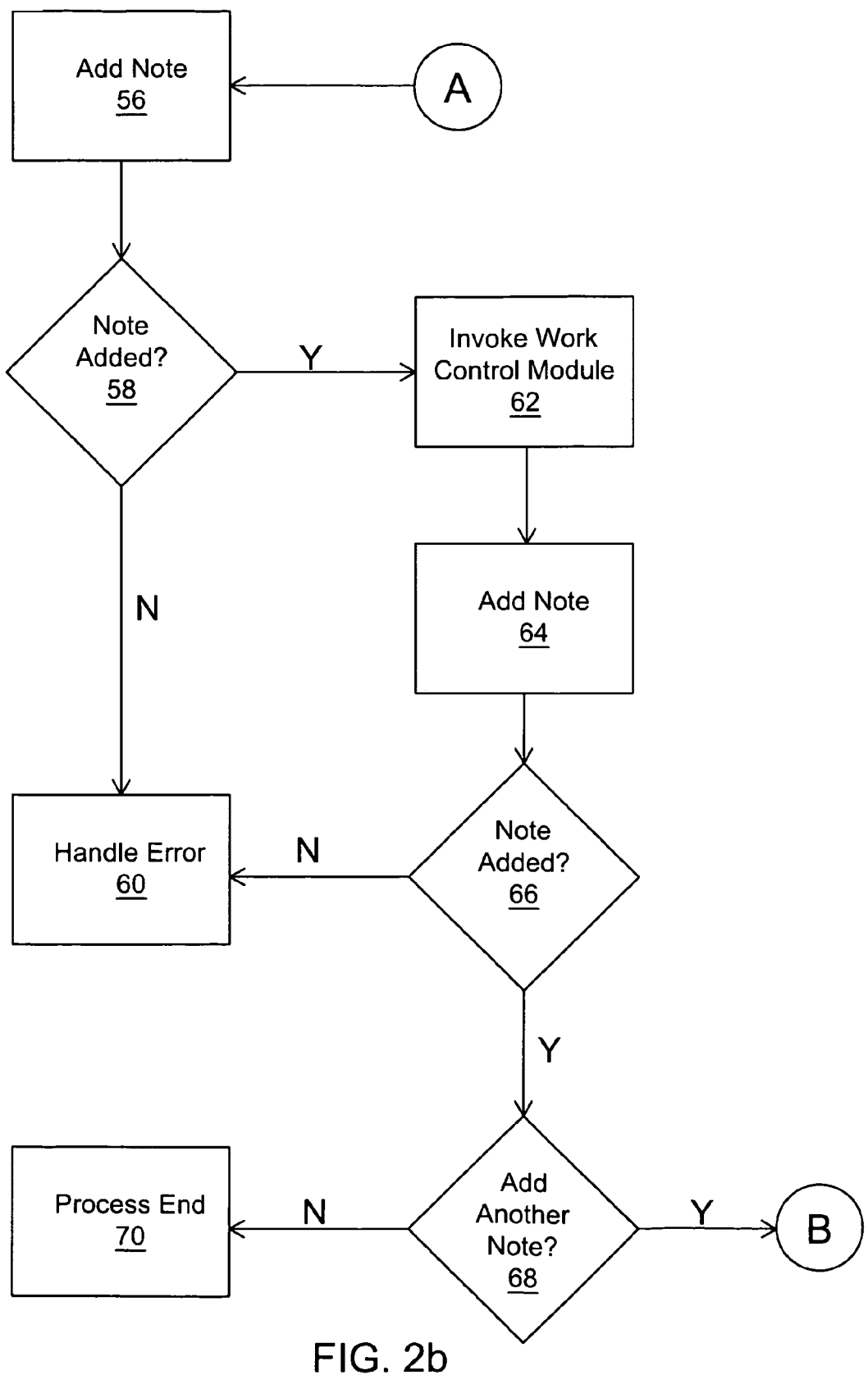

FIGS. 2A and 2B are diagrams illustrating a process flow through the note input module 22 of the system 10 of FIG. 1 according to one embodiment of the present invention. At step 40, the process begins by, for example, a user invoking the note input module 22 with the user terminal 20. At step 42, the process determines whether the user is a first-time user. If the user is not a first-time user, the process retrieves user information such as, for example, various password and ID information, from storage such as, for example, a storage medium located on the user terminal 20 at step 44. The password may be, for example, a password that is used to access internal pages in some of the modules of the system 10.

If the user is a first-time user, at step 46 the process obtains user information such as, for example, various password and ID information, and stores the information in, for example, a storage medium located on the user terminal 20. The information may be stored in, for example, a .ini file format. The entered password and ID information may be, for example, password and user ID information that allows the user to access, for example, internal pages of the provision management module 12 and the work control module 24. The process proceeds to step 44 where the user information is retrieved for later comparison.

At step 48, the process prompts the user to enter a note (e.g. a text message), an order number of the order to which the note corresponds, and a password. The password may be, for example, a password that uses the CA-ACF2® security management scheme offered by Computer Associates International, Inc. At step 50, the process determines whether the entered information from step 48 is valid. For example, the process may determine whether the order number and the note are valid and within expected ranges of text string size, etc. In one embodiment, the note input module 22 modifies the note text to conform to any data convention that may be required by, for example, the provision management module 12 or the work control module 24. If the information is not valid, the process proceeds to step 52 where an error message is dislayed to the user.

At step 54, the process invokes the provision management module 12. At step 56, the process adds the note to the corresponding order number in the provision management module 12 and then logs out of the provision management module 12. At step 58, the process determines whether the note was successfully added to the provision management module 12. If the note was not successfully added, the process enters an error handler step 60.

If the note was successfully added, the process invokes the work control module 24 at step 64, the process adds the note to the corresponding order number in the work control module 24 and then logs out of the work control module 24. At step 66, the process determines whether the note was successfully added to the work control module 24. If the note was not successfully added, the process enters the error handler step 60.

At step 68, the process prompts the user to determine if the user wants to add another note. If the user does not want to add another note, the process ends at step 70. If the user wants to add another note, the process returns to step 40 where the process starts again.

The process described herein in conjunction with FIGS. 2A and 2B thus allows a user of the system 10 to input information to both the provision management module 12 and the work control module 24 so that users of the system 10 need only access one of the modules 12, 24 to retrieve information. Also, the user that enters the information need only enter the information once and does not have to enter the information separately into each module 12, 24.

In one embodiment of the present invention, the methods and modules described herein are embodied in, for example, computer software code that is coded in any suitable programming language such as, for example, visual basic, C, C++, or microcode. Such computer software code may be embodied in a computer readable medium or media such as, for example, a magnetic storage medium such as a floppy disk or an optical storage medium such as a CD-ROM. Furthermore, in one embodiment of the invention, the system 10 is implemented on any suitable computer such as, for example, a personal computer.

While several embodiments of the invention have been described, it should be apparent, however, that various modifications, alterations and adaptations to those embodiments may occur to persons skilled in the art with the attainment of some or all of the advantages of the present invention. For example, although various embodiments of the invention have been illustrated herein as being applicable to a system with a provision management module and a work control module, it can be understood that the concepts, methods, and apparatuses described herein may be used with any type of appropriate system. It is therefore intended to cover all such modifications, alterations and adaptations without departing from the scope and spirit of the present invention as defined by the appended claims.

What is claimed is:

1. A method of adding a notation to a plurality of modules in a telecommunications provisioning system, comprising:
   accepting input of the notation;
   automatically invoking a first module;
   inputting the notation to the first module;
   automatically invoking a second module; and
   inputting the notation to the second module,
   wherein accepting input of the notation includes accepting input of a notation that includes at least one of an indication that required equipment is not available, that a customer location is not ready, that an order is incorrect, and that engineering work on an order is incorrect.

2. The method of claim 1, wherein automatically invoking a first module includes automatically invoking a provision management module, and wherein automatically invoking a second module includes automatically invoking a work control module.

3. The method of claim 1, further comprising accepting input of a work order number that corresponds to the notation.

4. The method of claim 3, further comprising determining whether the work order number and the notation are valid and, if the work order number or the notation is invalid, displaying an error message to the user.

5. The method of claim 1, further comprising modifying the notation to conform the notation to a data convention that is required by one of the first module and the second module.

6. The method of claim 1, further comprising accepting input of a user password stored in a file format.

7. The method of claim 1, further comprising the steps of:
   logging off the first module alter inputting the notation to the first module;
   determining whether the notation was successfully added to the first module;
   logging off the second module after inputting the notation to the second module; and
   determining whether the notation was successfully added to the second module.

8. The method of claim 7, further comprising the steps of:
   prompting a user to enter the notation as a text message;
   prompting the user to enter an order number of the order to which the note corresponds;
   prompting the user to enter a password; and
   prompting the user to determine if the user wants to add another notation.

9. A system, comprising:
   a provision management module;
   a work control module in communication with the provision management module;
   a user terminal in communication with the provision management module and the work control module; and
   a note input module in communication with the user terminal, wherein the note input module enables a user of the user terminal to simultaneously input a notation into the provision management module and the work control module, the notation including at least one of an indication that required equipment is not available, that a customer location is not ready, that an order is incorrect, and that engineering work on an order is incorrect.

10. The system of claim 9, wherein the user terminal is in communication with the provision management module via an order manager module.

11. The system of claim 9, wherein the user terminal is in communication with the work control module via a work request generator module.

12. The system of claim 9, further comprising a service order analysis and control module in communication with the provision management module.

13. The system of claim 9, further comprising a design process module in communication with the provision management module.

14. The system of claim 9, further comprising a work request issue module in communication with the work control module.

15. The system of claim 14, further comprising a technician user terminal in communication with the work request issue module.

16. The system of claim 9, wherein the note input module is in communication with the user terminal via a communications network.

17. The system of claim 9, wherein the note input module is embodied in computer code and stored on a computer storage medium in the user terminal.

18. The system of claim 9, wherein the user terminal includes a personal computer.

19. A telecommunications apparatus, comprising:
   means for accepting input of a notation;
   means for automatically invoking a first module;
   means for inputting the notation to the first module;
   means for automatically invoking a second module; and
   means for inputting the notation to the second module,
   wherein accepting input of the notation includes accepting input of a notation that includes at least one of an indication that required equipment is not available, that a customer location is not ready, that an order is incorrect, and that engineering work on an order is incorrect.

20. A computer readable medium having stored thereon instructions which, when executed by a processor, cause the processor to:
   accept input of a notation;
   automatically invoke a first telecommunications module;

input the notation to the first telecommunications module;
automatically invoke a second telecommunications module; and
input the notation to the second telecommunications module,
wherein accepting input of the notation includes accepting input of a notation that includes at least one of an indication that required equipment is not available, that a customer location is not ready, that an order is incorrect, and that engineering work on an order is incorrect.

* * * * *